United States Patent
Schmid et al.

(10) Patent No.: US 9,185,765 B2
(45) Date of Patent: Nov. 10, 2015

(54) ARRANGEMENT HAVING AT LEAST ONE METAMERIC ILLUMINATING DEVICE, AND PASSENGER CABIN

(71) Applicant: Diehl Aerospace GmbH, Überlingen (DE)

(72) Inventors: Frank Schmid, Poppenricht (DE); Martin Bachhuber, Altdorf (DE)

(73) Assignee: Diehl Aerospace GMBH, Ueberlingen (DE)

( * ) Notice: Subject to any disclaimer, the term of this patent is extended or adjusted under 35 U.S.C. 154(b) by 0 days.

(21) Appl. No.: 14/294,374

(22) Filed: Jun. 3, 2014

(65) Prior Publication Data
US 2014/0375205 A1 Dec. 25, 2014

(30) Foreign Application Priority Data
Jun. 22, 2013 (DE) .......................... 10 2013 010 512

(51) Int. Cl.
| | |
|---|---|
| B64D 47/02 | (2006.01) |
| B64D 11/00 | (2006.01) |
| G05F 1/00 | (2006.01) |
| H05B 37/02 | (2006.01) |
| H05B 39/04 | (2006.01) |
| H05B 41/36 | (2006.01) |
| H05B 33/08 | (2006.01) |

(52) U.S. Cl.
CPC ............ *H05B 33/0857* (2013.01); *B64D 47/02* (2013.01); *B64D 2011/0038* (2013.01); *B64D 2203/00* (2013.01)

(58) Field of Classification Search
None
See application file for complete search history.

(56) References Cited

U.S. PATENT DOCUMENTS

| | | | |
|---|---|---|---|
| 6,552,495 B1 | 4/2003 | Chang | |
| 2005/0237733 A1 | 10/2005 | Laski et al. | |
| 2010/0308745 A1* | 12/2010 | Delnoij | 315/294 |

FOREIGN PATENT DOCUMENTS

| | | |
|---|---|---|
| DE | 102005037571 A1 | 2/2006 |
| DE | 102008016756 A1 | 10/2009 |
| DE | 102010039308 A1 | 2/2012 |
| DE | 102011017546 A1 | 10/2012 |
| WO | WO 2006/109237 A1 | 10/2006 |
| WO | WO 2009/035493 A1 | 3/2009 |

OTHER PUBLICATIONS

English Abstract of WO 09/121539 A1 dated Oct. 8, 2009.
English Abstract of WO 12/020081 A1 dated Feb. 16, 2012.

* cited by examiner

*Primary Examiner* — Douglas W Owens
*Assistant Examiner* — Dedei K Hammond
(74) *Attorney, Agent, or Firm* — Scully, Scott, Murphy & Presser P.C.

(57) ABSTRACT

The invention relates to an arrangement having at least one metameric illuminating device (4) which comprises at least a first, second, third and fourth LED (6) and an internal controller (5) for changing the color rendering index of a light produced by additive color mixing of the first, second, third and fourth LED (6) with the aid of a prescribed color, having an external controller (8) for setting a parameter (K) influencing the color rendering index, and having a data transmitting device (7) for transmitting the parameter (K) to the internal controller (5) of the at least one metameric illuminating device (4).

6 Claims, 3 Drawing Sheets

ARRANGEMENT HAVING AT LEAST ONE METAMERIC ILLUMINATING DEVICE, AND PASSENGER CABIN

BACKGROUND OF THE INVENTION

The invention relates to an arrangement having at least one metameric illuminating device and to a passenger cabin, in particular the passenger cabin of a commercial aircraft.

DISCUSSION OF THE PRIOR ART

LED luminaires are generally known from the prior art. Such luminaires can be fitted, for example, with red, green and blue LEDs or else with red, green, blue and white LEDs in order to produce light of a prescribed colour. The prescribed colour is produced by an additive colour mixing of the light emitted by the LEDs.

The so-called "RGB algorithm" for setting a prescribed colour with the aid of luminaires fitted with red, green and blue LEDs is known from U.S. Pat. No. 6,552,495 B1. The RGB algorithm can be used to calculate the intensities corresponding to the prescribed colour or to a prescribed colour locus, for the red, green and blue LED.

DE 10 2008 016 756 A1 and WO 2006/109237 A1 describe the so-called "RGBW algorithm". For a prescribed colour locus, the RGBW algorithm can be used to calculate the intensities corresponding thereto for a red, green, blue and white LED.

DE 10 2005 037 571 A1 discloses a "metameric luminaire". It is thereby possible to produce a light of a prescribed colour or to produce a prescribed colour locus by additive colour mixing of light with a different spectrum. The colour rendering index (CRI) can be different at the respective colour locus as a function of the spectra of the light used.

The colour rendering index specifies how much the colour rendering of a light source differs from the "ideal" of incandescent light or daylight. In general, an attempt is made to achieve the highest possible colour rendering index when developing LED luminaires.

In order to emphasize specific surfaces, for example the surface of a leather seat in an aircraft cabin, it can be expedient not necessarily to shine onto the surface a light which has the highest colour rendering index that the LED luminaire can produce. A specific colour rendering index is used in accordance with subjective and empirical criteria. There is a need for an arrangement which facilitates as simple as possible a setting of the colour rendering index.

SUMMARY OF THE INVENTION

It is an object of the invention to satisfy this demand according to the prior art. The aim, in particular, is to specify an arrangement which enables a simple and quick changing or setting of the colour rendering index in a metameric illuminating device.

There is proposed according to the invention an arrangement having at least one metameric illuminating device which comprises at least a first, second, third and fourth LED, the LEDs respectively producing light of mutually differing colour loci, and an internal controller for changing the colour rendering index of a light produced by additive colour mixing of the first, second, third and fourth LED with the aid of a prescribed colour, having an external controller for setting a parameter influencing the colour rendering index, and having a data transmitting device for transmitting the parameter to the internal controller of the at least one metameric illuminating device.

According to the invention, the internal controller of the metameric illuminating device is connected to an external controller via a data transmitting device. The external controller easily enables setting and/or changing of a parameter with which the colour rendering index can be influenced. In particular, when the arrangement comprises a plurality of metameric illuminating devices, it is possible to use the proposed central controller to change the colour rendering index quickly and easily in the case of all the metameric illuminating devices. In particular, the colour rendering index can be changed in this case in accordance with subjective impressions, so that a surface of fittings, for example, a leather cover of passenger seats, is shown to particular advantage.

The "data transmitting device" in the sense of the present invention can be a wired or wireless data transmitting device. For example, the data transmitting device can be a Bluetooth, IR data transmitting device or the like. Furthermore, it is also possible to transmit the data via a power supply device leading to the metameric illuminating device.

According to an advantageous configuration of the invention, the internal controller comprises a program for carrying out a method for changing the colour rendering index with the following steps:

determining a colour locus corresponding to the prescribed colour in the RGB colour triangle;

calculating first intensity ratios $I1_R:I1_G:I1_B$ corresponding to the colour locus for the first, second and third LED from the RGB colour triangle;

selecting an R/G/B/W colour sub-triangle which is contained in the RGB colour triangle and contains the colour locus and of which one corner is formed by the colour locus of the fourth LED and whose two other corners are formed by two of the three colour loci of the RGB colour triangle;

calculating second intensity ratios $I2_W:I2_{F1}:I2_{F2}$ corresponding to the colour locus for the fourth LED and for the two further LEDs from the R/G/B/W colour sub-triangle;

calculating third intensity ratios $I3_W:I3_R:I3_G:I3_B$ in accordance with the following relationship:

$$I3_W:I3_R:I3_G:I3_B = K*(I1_R:I1_G:I1_B) + (1-K)*(I2_W:I2_{F1}:I2_{F2}),$$

K being the parameter with $0 \leq K \leq 1$; and calculating pulse width modulation values corresponding to the third intensity ratios $I3_W:I3_R:I3_G:I3_B$ for each of the LEDs.

The term "RGB colour triangle" is understood to mean a triangle whose corners are defined by the colour loci of the first, second and third LEDs that are used in a colour space. For example, CIE 1931, CIE 1976, CIE LUV or the like can be used as colour spaces. The respective coordinate system then to be used depends on the particular colour spaces from which the RGB colour triangle is derived.

The R/G/B/W colour sub-triangle is defined by the colour locus, lying within the RGB colour triangle, of the fourth LED and via two corners of the RGB colour triangle. The R/G/B/W sub-triangle also contains the colour locus which corresponds to the prescribed colour.

The first and second intensity ratios can be calculated using conventional RGB algorithms, or by calculating the centroid of the respective triangle, or the like.

The proposed method enables the colour rendering index of the light to be varied while the colour locus remains the same. The colour rendering index, and thus the look of a surface illuminated with the light, can be varied as a function of the parameter K. For example, the colour rendering index can be set to make a covering of fabric or leather on aircraft seats particularly attractive to the passenger.

It is also easily possible to use the method to change the colour rendering index of the light produced by means of the LEDs for a prescribed colour locus. The proposed method can be carried out easily by means of a process computer. All that is required to find a suitable colour rendering index for the surfaces respectively to be illuminated is to vary the parameter K.

The inventive method has been described above by the use of four LEDs which produce light of a respectively different colour locus. The above method can, however, also be applied by using more than four LEDs which produce light of a respectively different colour locus.

According to an advantageous refinement, the second intensity ratios $I2_W:I2_{F1}:I2_{F2}$ are calculated by setting to 1 the intensity $I2_W$ of the light produced by the fourth LED. This further facilitates the calculation of the third intensity ratios.

Moreover, in order to vary the brightness of the light produced with the LEDs it is possible to influence the pulse widths or pulse durations by means of a further parameter. The further parameter can also assume values between 0 and 1. The brightness of the light produced with the LEDs can also be varied by changing the current. Regardless thereof, the external controller can be used to transfer to the internal controller via the data transmitting device a colour locus parameter with which the colour locus can be influenced. The colour locus can be prescribed by the appropriate coordinates X, Y or U', V' depending on the colour space used.

The parameter is advantageously produced by means of the external controller. To this end, the external controller can comprise a particular program which produces the parameter corresponding thereto as a function of a setting undertaken, for example, by a user on a display screen.

In the arrangement according to the invention, it is expedient when the first LED produces red light, the second LED produces green light, the third LED produces blue light and the fourth LED produces white light. Such LEDs are available cost-effectively A passenger cabin for a commercial aircraft having an arrangement according to the invention is proposed according to a further measure of the invention. A particularly effective and pleasant illumination of a passenger cabin is enabled by providing the inventive arrangement therein.

The external controller is advantageously a computer-aided cabin management system. Such a cabin management system is already a component of a passenger cabin according to the prior art. For example, it is possible thereby to change a brightness of an LED illuminating device. In accordance with the invention, it is now provided that in addition to the so far customary control parameters, the parameter according to the invention is now also transmitted via the data transmitting device to the internal controller of the LED illuminating device. The cabin management system can now be used in order also to change the colour rendering index of the LED illuminating device because of the configuration of the internal controller of the illuminating device as proposed by the invention.

BRIEF DESCRIPTION OF THE DRAWINGS

An exemplary embodiment of the invention is explained in more detail below with the aid of the drawings, in which.

DETAILED DESCRIPTION OF THE INVENTION

Figure 1:
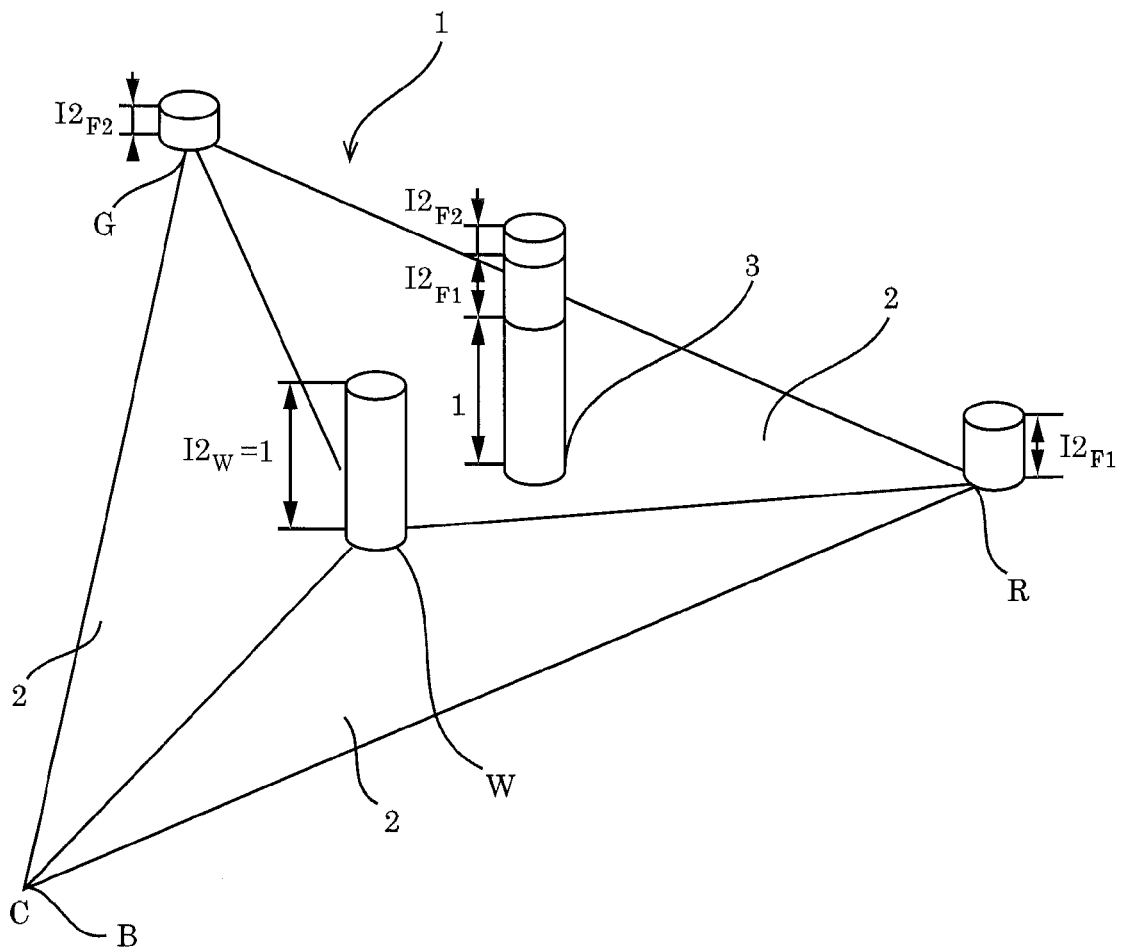
FIG. 1 shows an RGB colour triangle with an R/G/B/W colour sub-triangle contained therein.
Figure 2:
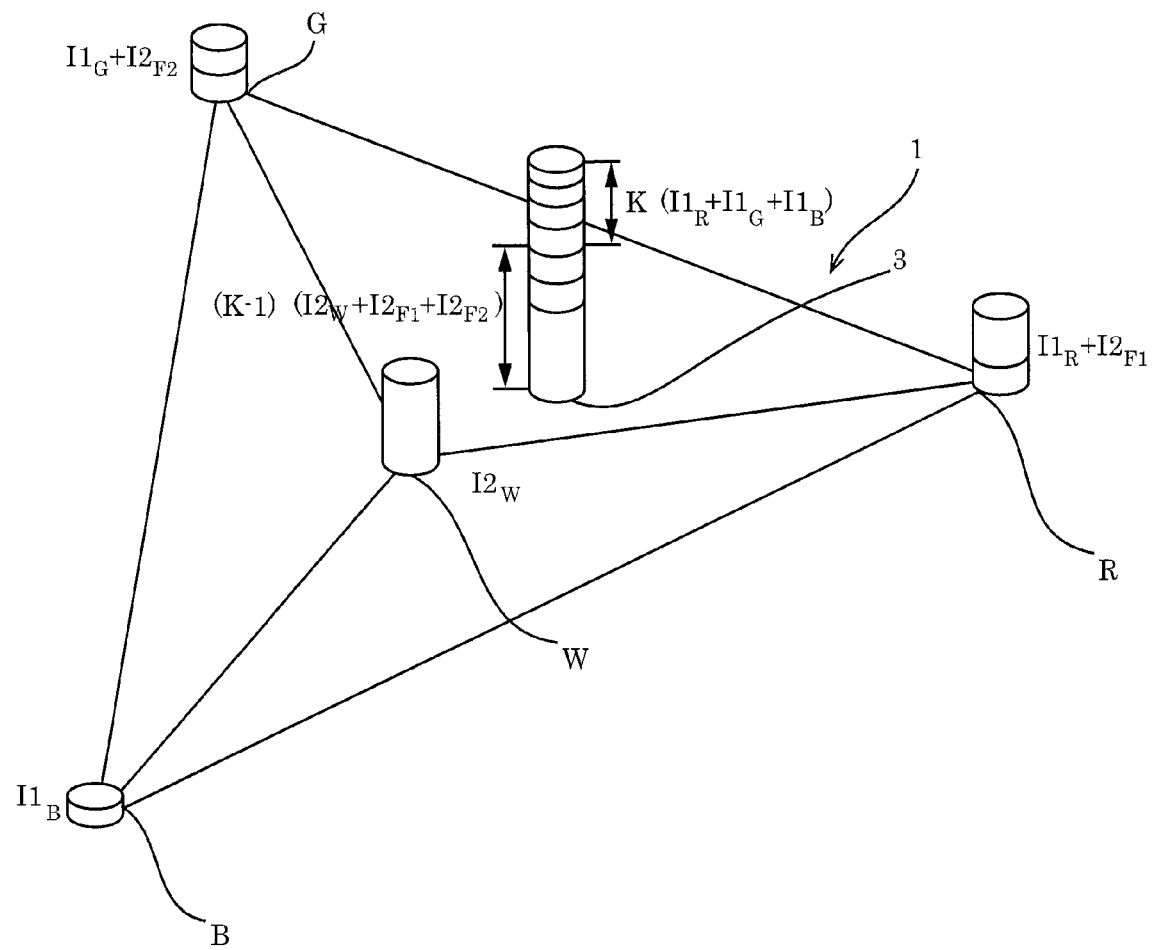
FIG. 2 shows the RGB colour triangle in accordance with FIG. 1.

A method for changing the colour rendering index is firstly explained in more detail with the aid of FIGS. 1 and 2.

FIGS. 1 and 2 respectively show an RGB colour triangle 1. The RGB colour triangle 1 images a partial area of a conventional colour space, for example, of the colour space CIE 1976. The corner point R of the RGB triangle lies in the region of the red colour, the corner point G in the region of the green, and the corner point B in the region of the blue. The coordinate axes of the colour space are omitted here for the sake of simplicity. The corner points R, G, B can be described exactly by the corresponding coordinates of the respective colour space. Located in the RGB colour triangle 1 is the further point W which, together with two of the corner points R, G, B defines a total of three sub-triangles 2 contained in the RBG colour triangle 1. Located in one of the sub-triangles 2 is the colour locus 3 of the prescribed colour which is to be produced by additive colour mixing. To this end, use is made in the present example of four LEDs whose colour loci are defined by the points R, G, B and W. The four LEDs used are therefore a red, green, blue and white LED.

An intensity $I2_W$ can be set equal to 1 at point W, for example, in order to produce intensity ratios corresponding to the colour locus 3. In accordance with the conventional RGB algorithm, for the points R and G this then yields intensities $I2_{F1}$, $I2_{F2}$ which yield the colour locus 3 on additive colour mixing. Depending on the RGB algorithm used and on the colour loci R, G, B prescribed by the LEDs used, a specific first colour rendering index of the light produced with the LEDs results for the colour locus 3. In FIG. 1, the intensity ratio of $1:I2_{F1}:I2_{F2}$ results for the colour locus 3 for the white, the red and the green LEDs.

FIG. 2 shows the RGB colour triangle 1 in accordance with FIG. 1. Furthermore, FIG. 2 shows diagrammatically an inventive solution in the case of which further intensity ratios $I1_R:I1_G:I1_B$ resulting from an RGB algorithm have been calculated from the RGB colour triangle 1 by omitting the white component W.

The colour locus 3 determined according to the method is now produced by an additive colour mixing of the four LEDs used, specifically the red, the green, the blue and the white LEDs. In this case, the solution resulting from FIG. 1 for the sub-triangle 2 is combined with the solution for the RGB colour triangle 1 resulting from FIG. 2. In the present example, the combination is made by multiplying the intensity ratios $I2_W:I2_{F1}:I2_{F2}$, resulting according to FIG. 1, with the metameric factor K−1. The further intensity ratios $I1_R:I1_G:I1_B$, resulting from the RBG colour triangle 1 in accordance with FIG. 2, are multiplied by the factor K. Subsequently, the respective mutually corresponding intensities are added, that is to say the total intensity for the point R is equal to $I1_R+I2_{F1}$, the total intensity for the point G is equal to $I1_G+I2_{F2}$. The total intensity for the point B is equal to $I1_B$, the total intensity for the point W is equal to $I2_W$. A total intensity in the colour locus 3 results by adding all the partial intensities of the two solutions, that is to say $I_{Gesamt}$ (i.e. $I_{Total}$) is equal to $K*(I1_R+I1_G+I1_B)+(K-1)*(I2_W+I2_{F1}+I2_{F2})$. The total intensity I can be set by means of a further factor influencing the brightness.

Pulse widths and modulation ratios can be calculated from each of the LEDs in the conventional way from the total intensity ratios thus determined.

Figure 3:
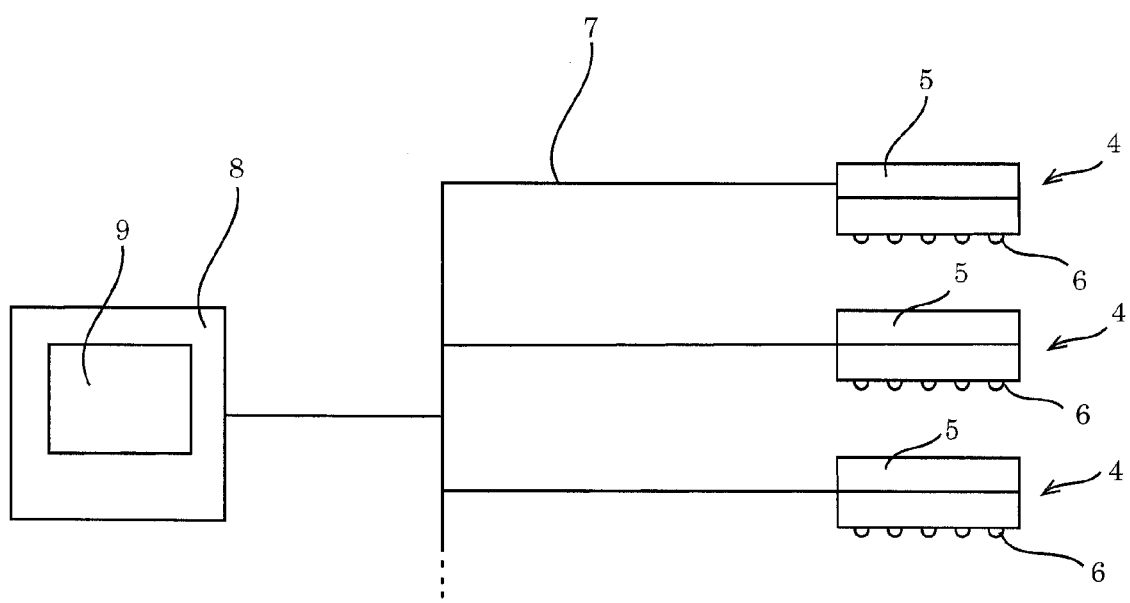
FIG. 3 shows a schematic view of an arrangement according to the invention.

A block diagram for an inventive arrangement is shown diagrammatically in FIG. 3. Metameric illuminating devices are denoted in general by the reference symbol 4; each of them has an internal controller 5 with which a plurality of LEDs 6 are driven. Each of the internal controllers 5 is connected via a data transmitting device 7 to an external controller 8 which can, for example, include a touch screen panel 9.

The internal controller 5 is fashioned so that the method described in FIGS. 1 and 2 can be executed therewith. To this end, the parameter K is produced by the external controller 8 in accordance with an input performed via the touch screen panel 9, and is transmitted to the internal controller 5 via the data transmitting device 7. The colour rendering index of the metameric illuminating device 4 is set in accordance with the prescribed parameter K by means of the internal controller 5 and using the algorithm described with the aid of FIGS. 1 and 2. Apart from this, further parameters can also be produced by means of the external controller 8 and be transmitted to the internal controller 5 via the data transmitting device 7. For example, a brightness or a colour locus 3 can be set using the further parameters. For this purpose, the internal controller 5 includes further programs, known per se in accordance with the prior art, for setting the brightness and/or the colour locus 3.

LIST OF REFERENCE SYMBOLS

1 RGB colour triangle
2 R/G/B/W colour sub-triangle
3 Colour locus
4 Metameric illuminating device
5 Internal controller
6 LED
7 Data transmitting device
8 External controller
9 Touch screen panel
B Corner point in the blue region of the RGB colour triangle
G Corner point in the green region of the RGB colour triangle
$I1_R:I1_G:I1_B$ Further intensity ratio
$I2_W:I2_{F1}:I2_{F2}$ Intensity ratio
K Metameric factor
R Corner point in the red region of the RGB colour triangle
W White colour locus

What is claimed is:

1. An arrangement having at least one metameric illuminating device which comprises at least a first, second, third and fourth LED and an internal controller for changing the colour rendering index of a light produced by additive colour mixing of the first, second, third and fourth LED with the aid of a prescribed colour, having an external controller for setting a parameter (K) influencing the colour rendering index, and having a data transmitting device for transmitting the parameter (K) to the internal controller of the at least one metameric illuminating device, the internal controller comprising a program for carrying out a method for changing the colour rendering index with the following steps:

determining a colour locus corresponding to the prescribed colour in the RGB colour triangle;

calculating first intensity ratios $I1_R:I1_G:I1_B$ corresponding to the colour locus for the first, second and third LED from the RGB colour triangle;

selecting an R/G/B/W colour sub-triangle which is contained in the RGB colour triangle and contains the colour locus and of which one corner is formed by the colour locus of the fourth LED and whose two other corners are formed by two of the three colour loci of the RGB colour triangle;

calculating second intensity ratios $I2_W:I2_{F1}:I2_{F2}$ corresponding to the colour locus for the fourth LED and for the two further colour LEDs from the R/G/B/W colour sub-triangle;

calculating third intensity ratios $I3_W:I3_R:I3_G:I3_B$ in accordance with the following relationship:

$$I3_W:I3_R:I3_G:I3_B = K*(I1_R:I1_G:I1_B) + (1-K)*(I2_W:I2_{F1}:I2_{F2}),$$

K being the parameter with $0 \leq K \leq 1$; and calculating pulse width modulation values (PWM) corresponding to the third intensity ratios $I3_W:I3_R:I3_G:I3_B$ for each of the LEDs.

2. The arrangement according to claim 1, wherein further parameters can be transmitted to the internal controller by means of the external controller, the further parameters being a brightness parameter influencing a brightness of the LEDs, and/or a colour locus parameter influencing the colour locus.

3. The arrangement according to claim 1, wherein the parameter (K) is produced by means of the external controller.

4. The arrangement according to claim 1, wherein the first LED produces red light, the second LED produces green light, the third LED produces blue light and the fourth LED produces white light.

5. A passenger cabin for a commercial aircraft having an arrangement according to claim 1.

6. The passenger cabin according to claim 5, wherein the external controller is a computer-aided cabin management system.

* * * * *